Aug. 4, 1925.
A. C. MASON
1,548,369
FABRIC SHEARING MACHINE
Filed July 20, 1921    3 Sheets-Sheet 2
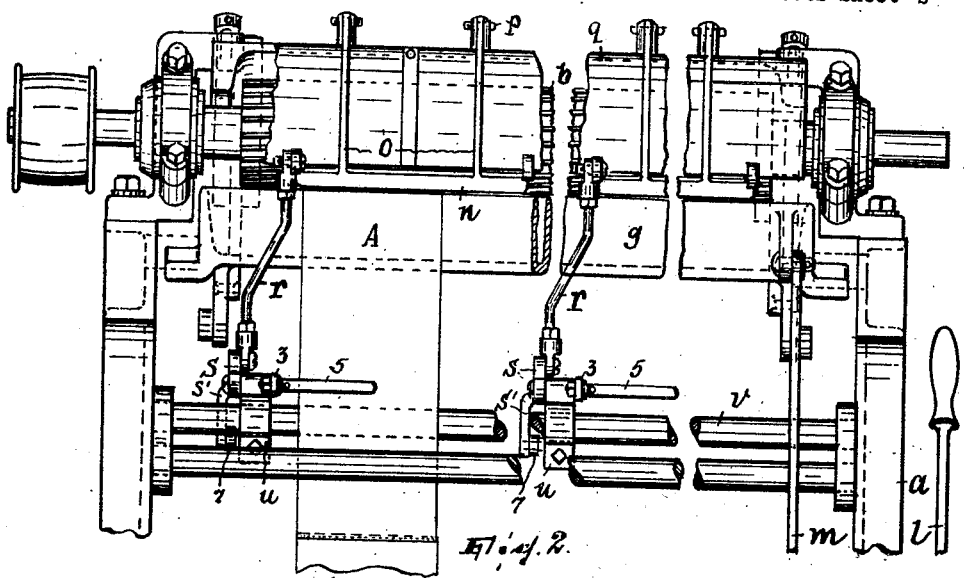

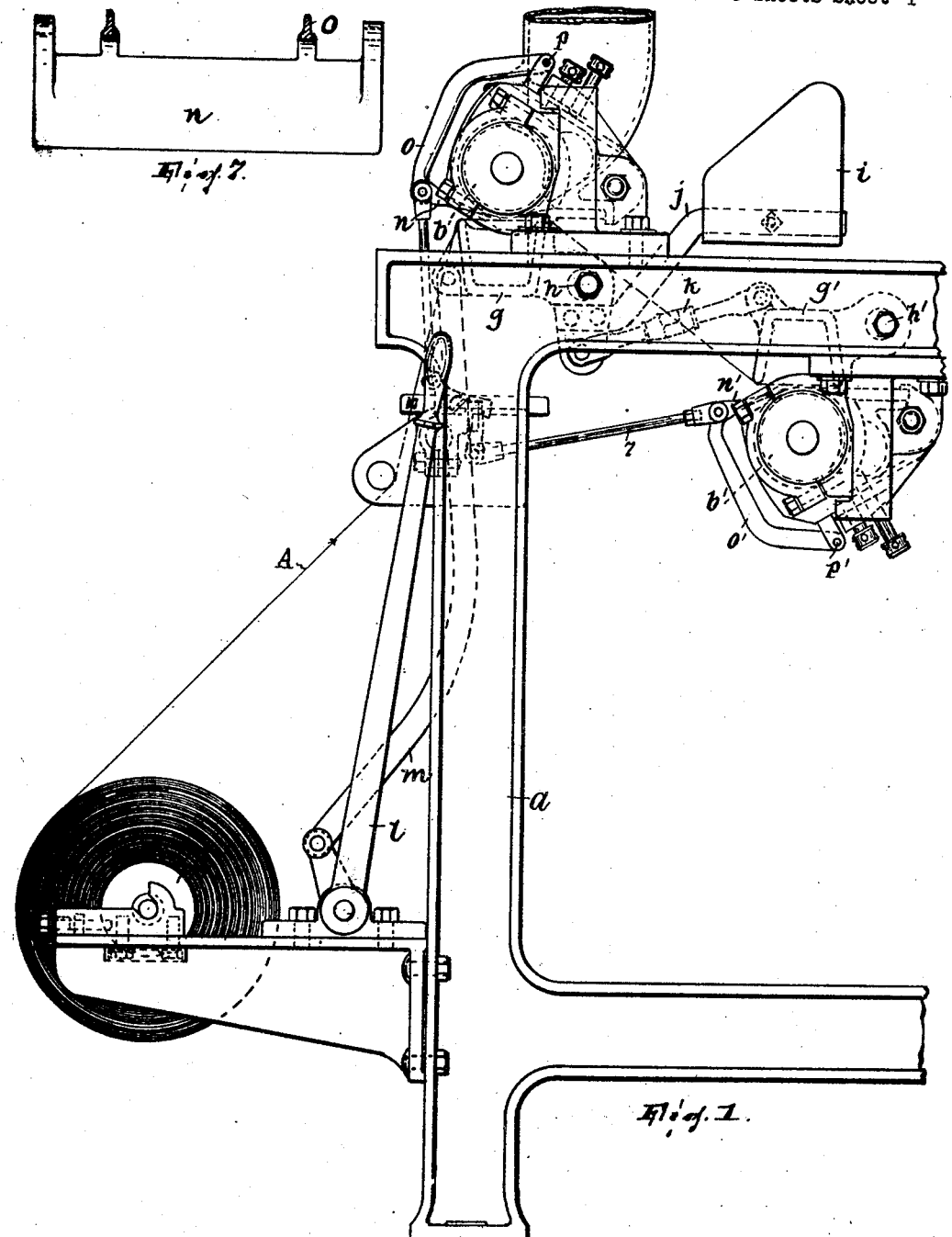

Aug. 4, 1925.
A. C. MASON
1,548,369
FABRIC SHEARING MACHINE
Filed July 20, 1921   3 Sheets-Sheet 3
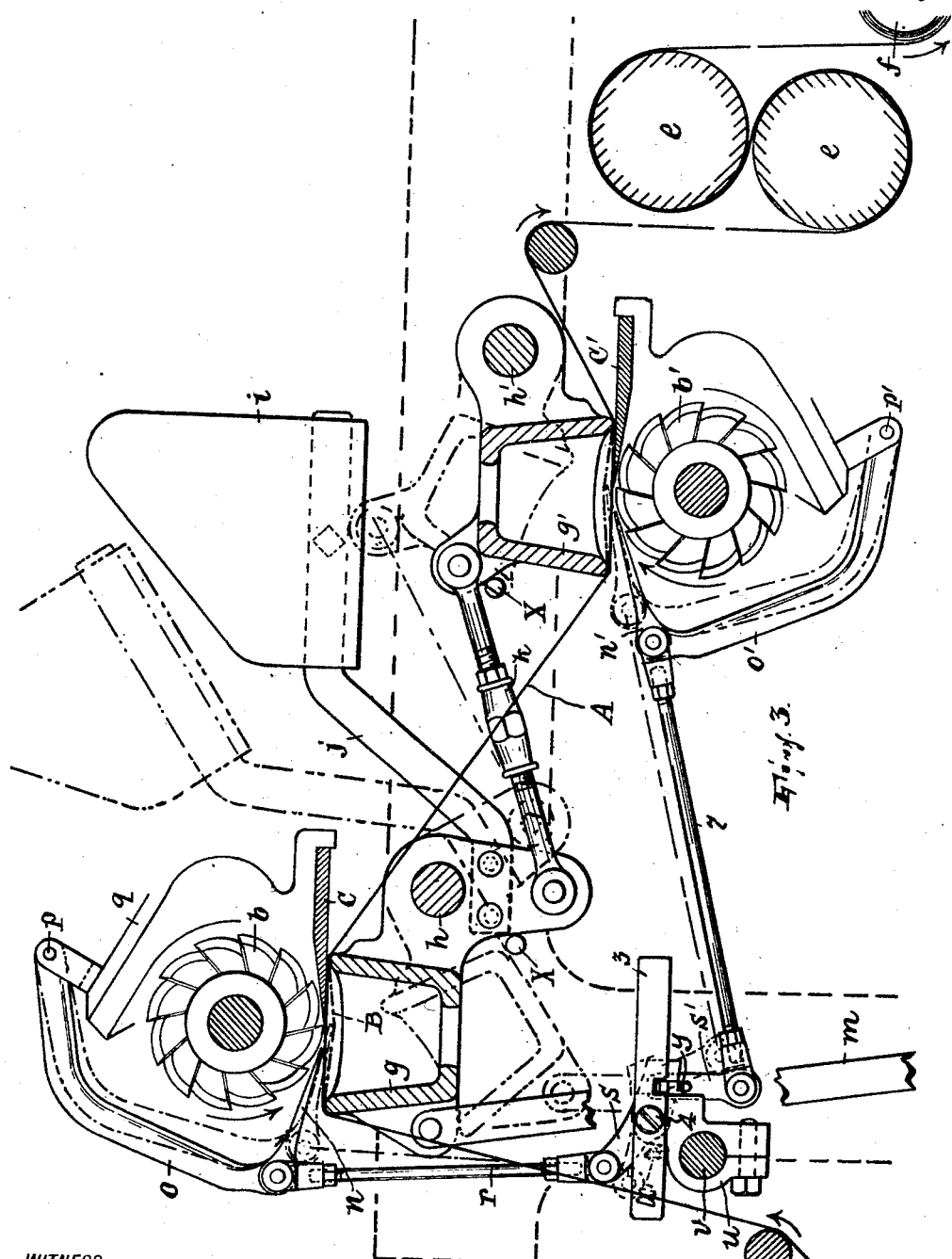
WITNESS
INVENTOR,
Arthur C. Mason,
BY
ATTORNEY Patented Aug. 4, 1925.

1,548,369

UNITED STATES PATENT OFFICE.

ARTHUR C. MASON, OF HAWTHORNE, NEW JERSEY, ASSIGNOR TO HERMAS MACHINE CO., INC., OF HAWTHORNE, NEW JERSEY, A CORPORATION OF NEW JERSEY.

FABRIC-SHEARING MACHINE.

Application filed July 20, 1921. Serial No. 486,026.

*To all whom it may concern:*

Be it known that I, ARTHUR C. MASON, a citizen of the United States, residing at Hawthorne, in the county of Passaic and State of New Jersey, have invented certain new and useful Improvements in Fabric-Shearing Machines, of which the following is a specification.

This invention relates to means for shearing fabrics, as in removing the nap or other surface material therefrom.

The invention consists, first, in a shearing machine having provision for shearing both faces of a fabric at once and for conjoint movement of means in two pairs of means each pair of which is operative in effecting a shearing of a face of the fabric, whereby said pairs of means will be together put in condition either to admit the fabric when manually introducing it at the beginning of a treatment or for performing the shearing.

In these machines, since the fabrics to be treated are generally stitched together end to end to form a strip, it is usual to provide for a stopping of the cutting or shearing operation at the moment when one of the stitched seams is passing the cutting means, thus to avoid cutting the seam or perhaps injuring the fabric. Heretofore this has been accomplished by moving the shearing or cutting means from the rest which supports the fabric in operative relation thereto or by moving said rest from the shearing means, either involving an undesirable disturbance of the proper relation of these parts to each other. My invention therefore consists, secondly, in a novel combination in which there is means to press the fabric away from the cutting means, whereby the positions of the cutting and fabric-supporting means or rest need not be disturbed. I have herein shown this feature of my invention in connection with means whereby the pressing means is controlled by the fabric automatically, i. e., so that when a seam or similar irregularity approaches the fabric will be automatically pressed away from the shearing means.

The invention consists, thirdly, in a novel combination of parts involving the automatic or fabric-controlled separation of the cutting means and fabric, as when a seam or other irregularity approaches the cutting or shearing means.

In the drawings,

Figure 1 is a side elevation of sufficient of a machine embodying the invention to illustrate the same;

Figure 2 is a front elevation;

Figure 3 is a front-to-rear section on a larger scale;

Figures 4, 5 and 6 are a left side elevation, a rear elevation and a plan of details of the automatic control means; and Figure 7 is a plan of the fabric displacer.

The frame includes two side standards $a$ and certain cross-shafts to be referred to connecting the same.

In the frame are journaled the suitably rotated horizontal shafts (one forward of and in a higher plane than the other) of the rotary cutters $b$ $b'$, and in the usual cooperative relation to these are the fixed or ledger blades $c$ $c'$, these being in the present case arranged in horizontal planes the former below cutter $b$ and the latter above cutter $b'$. The forward or cutting edges of these blades are approximately in vertical planes coincident with the axes of the rotary cutters and close to the cutters so that the cutters, with the assistance of the blades, may act in the well-known way to cut or trim off the nap of the fabric when the latter is moved over the surfaces of the blades away from the cutters, both surfaces of the fabric being treated in the present case, as will appear.

$d$ designates the fabric supply beam, $e$ the take-up rollers and $f$ the fabric receiving beam. The machine may contain any usual means (not shown) for driving the cutters and take-up rolls and fabric receiving beam continuously.

Arranged to cooperate with each cutter and ledger blade is a fabric rest, or means to hold the fabric strip, while being fed through the machine and held in a more or less distended state as shown in Fig. 3, in such relation to the cutter and blade that they will shear the nap from the surface thereof. Each of these rests $g$ $g'$ is of the well-known trough-shaped form. Rest $g$ is arranged on a shaft $h$ under cutter $b$ with its open side up and rest $g'$ on a shaft $h'$ over cutter $b'$ with its open side down. In order to afford the necessary temporary clearance between them and the shearing means when the fabric strip is introduced at the beginning of a shearing treatment they are fulcrumed on these cross-shafts, normally resting against suitable stops $x$, the contact between the rest $g$ and the said stops being maintained by a weight $i$ adjustable on an arm $j$ projecting from the rest. The rests are connected together by an adjustable coupling $k$ so as to move in synchrony, both toward or both from the respective shearing means. $l$ is a lever having a link $m$ connecting it with the rest $g$, whereby the rests may be moved from their normal or working positions.

The machine shown in the drawings is adapted to treat several fabric strips, side by side, all at once. Since it will be preferable in such a case to provide individual means for automatically separating the fabric strips and shearing means, the present example presents such an arrangement, and these means being all alike, the following description of one will serve for all:

A blade or flat bar $n$ is hung, by means of one or more upstanding bent arms $o$ rigidly projecting upwardly therefrom, from a pivot $p$ parallel with the axis of and above the cutter $b$, said pivot being conveniently placed upon the usual housing $q$ for the cutter. The plane of the blade $n$ with reference to the axis $p$ is such that when the structure including it moves in the anti-clockwise direction the free or inner edge of the blade will press against the fabric strip A more or less in advance of the acting edge of the ledger blade, and of course at that part of the strip which bridges the fabric rest $g$, and force it away from the cutter; see the broken line B in Fig. 3. So long as it holds the (advancing) fabric away from the cutter it acts as a guide therefor, since it affords a straight edge as seen in Fig. 2. Movement of the blade in the opposite direction will of course permit return of the part of the strip which bridges the rest to the full line position. The device in question is normally influenced by gravity to move in the direction to press against the fabric. It is connected by a link $r$ with one end of a lever $s$ fulcrumed at $t$ (Fig. 4), between its ends, on a bracket $u$ secured on the cross-shaft $v$, the other end of the lever being normally held against rising (under the downward thrust of said device) by having a stud $w$ (on a rigid depending arm $s'$ thereof) which underlies the toe $x$ of a latch $y$ fulcrumed at $z$ on the bracket $u$. When, said device having been allowed to fall, the same is again elevated to the full line position in Fig. 3 the downwardly moving inner end portion of the lever $s$ (specifically, its stud $w$) will cam back the latch, whose toe is suitably formed with a cam surface $x'$ for this purpose, until it clears the same and is thereby locked against return movement. The latch is held in the normal position by a compression spring 2. The movement of the latch under pressure of the spring is limited by its contact with the rear end of a lever 3, which is a lever fulcrumed between its ends at 4 and in turn has its movement under pressure of said spring limited by a set-screw $3'$ which contacts with bracket $u$, the forward end of lever 3 having an elongated horizontally projecting spring fork 5 the slit 6 of which is adapted to receive the edge portion of the strip A undergoing treatment. Assuming the mechanism described to be in the position illustrated by full lines in the drawings and that the fabric strip is being drawn through the machine and undergoing treatment, whenever a seam or other undue enlargement encounters the fork 5 and so acts to depress the rear end of lever 3 the toe $x$ of the latch will be moved clear of the stud $w$ of lever $s$, allowing the strip displacing device to fall and press the fabric away from the cutter. The fork 5 is formed so that one arm at least will yield relatively to the other so that, though a seam encountering the fork will cause actuation of lever 3, it will nevertheless be pulled between and so pass the arms of the fork; and so when the seam has advanced sufficiently to have passed the shearing zone the operator raises the strip displacing device to the solid line position, in which position it will be caught and again held by the latch $y$.

Since, as explained, both faces of the fabric are adapted to be sheared in the present machine, provision is made for a fabric displacing device to cooperate with the cutter $b'$, ledger blade $c'$ and rest $g'$. The device, marked $n'$ $o'$, is a counterpart of the device $n$ $o$, but instead of depending from its pivot, $p'$, it extends upwardly, its blade $n'$ acting to press the fabric strip upwardly, to force it away from the cutter, when the device is moved in the clockwise direction. The fabric displacing devices $n$ $o$ and $n'$ $o'$ are adapted to move both toward or both from the strip together, as by a link 7 which connects the device $n'$ $o'$ with the rigid depending arm $s'$ of lever $s$.

The fabric displacing device can be made quite light and easy to move. Hence it can be caught and held by a latch that may be readily moved, as by the fabric itself through the lever 3, no other agency (as some going part of the machine) to move the latch being necessary. The automatic part of the mechanism is consequently quite simple.

Having thus fully described my inven- tion, what I claim as new and desire to secure by Letters Patent is:—

1. In combination, two pairs of coacting means for effecting shearing of the opposite faces of a fabric while advancing the same, one means in each such pair being a shearing means and the other being means to hold the fabric in a plane where one face thereof will be sheared by said shearing means and one means in each pair being movable toward and from said plane, and means to couple for conjoint movement the movable means in one pair with the movable means in the other pair.

2. In combination, two pairs of coacting means for effecting shearing of the opposite faces of a fabric while advancing the same, one means in each such pair being a shearing means and the other being means to hold the fabric in a plane where one face thereof will be sheared by said shearing means and being movable toward and from said plane, and means to couple together said holding means for conjoint movement.

3. In combination, two pairs of coacting means for effecting shearing of the opposite faces of a fabric while advancing the same, one means in each such pair being a shearing means and the other being means to hold the fabric in a plane where one face thereof will be sheared by said shearing means and being pivotally movable toward and from said plane, and means to couple together said holding means for conjoint movement.

4. In a machine for cutting surface material from a fabric while advancing the same, the combination of means to advance the fabric in a distended state, a cutting means, means to support the fabric with one surface thereof in operative relation to the cutting means, said supporting means permitting yield of the distended part of the fabric from the cutting means, and means to press the distended part of the fabric away from the cutting means.

5. In a machine for cutting surface material from a fabric while advancing the same, the combination of means to advance the fabric in a distended state, spaced supporting means adapted to be bridged by the advancing fabric, cutting means arranged in position to operate on one face of the bridging portion of the fabric, and means to press the distended bridging portion of the fabric away from the cutting means.

6. In a machine for cutting surface material from a fabric while advancing the same, the combination of means to advance the fabric in a distended state, a cutting means including a rotary cutter, means to support the fabric in a plane substantially parallel with the axis of and with one surface in operative relation to the cutter, said supporting means permitting yield of the distended part of the fabric from the cutter, and means, enterable between the fabric and cutter, to press the distended part of the fabric away from the cutter.

7. In a machine for cutting surface material from a fabric while advancing the same, the combination of means to advance the fabric in a distended state, a cutting means, means to support the fabric in a plane with one surface in operative relation to the cutter, said supporting means permitting yield of the distended part of the fabric from the cutter, and means, pivoted on an axis parallel with said plane, to press the distended part of the fabric away from the cutter.

8. In a machine for cutting surface material from a fabric while advancing the same, the combination of cutting means, means to guide the advancing fabric parallel with the cutting plane, one of said means being movable back and forth in a line at an angle to said plane, whereby to change the distance between the fabric and cutting means, and being normally urged to move in one direction, a latch to hold said movable means against movement in said direction, and means to transmit motion from the advancing fabric to the latch.

9. In a cloth shearing machine, the combination of a shearing blade and cooperating cloth rest, a cloth depressing member pivotally mounted to move into position to depress that portion of the cloth in advance of the shear blade, and seam-controlled means for causing the pivotal movement of said cloth-depressing means, substantially as described.

10. In a cloth shearing machine, the combination with a shear blade and its cooperating cloth rest, of a movable cloth-depressing device arranged to move into position to engage and depress the cloth in advance of the shear, actuating means for causing said cloth-depressing means to operate, a detent for normally preventing the operation of said actuating means, and seam actuated means for releasing said detent in order to cause the depression of the cloth as the seam approaches the shear blade, substantially as described.

11. In a cloth shearing machine, the combination of a cloth shearing blade, a cooperating cloth rest formed with an intermediate gap between its cloth-supporting portions, normally inactive means arranged and actuated to depress the cloth into said gap in advance of the shear blade, and seam-controlled means whereby the actuating of said cloth-depressing means is caused by the seam approaching the cloth rest, substantially as described.

12. In a cloth shearing machine, the combination of cloth shearing means, a recessed cloth rest arranged in cooperative relationship thereto in order to properly present the cloth for shearing, and means actuated through the agency of the cloth seam approaching said shearing means for depressing a portion of the cloth between the cloth rest and the shearing means into the cloth rest away from the normal line of travel of the cloth to the shear, substantially as described.

In testimony whereof I affix my signature.

ARTHUR C. MASON.